(12) United States Patent
Kim et al.

(10) Patent No.: US 8,405,717 B2
(45) Date of Patent: Mar. 26, 2013

(54) APPARATUS AND METHOD FOR CALIBRATING IMAGES BETWEEN CAMERAS

(75) Inventors: Jong Sung Kim, Daejeon (KR); Hye-mi Kim, Daejeon (KR); Jae-Hean Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 728 days.

(21) Appl. No.: 12/549,650

(22) Filed: Aug. 28, 2009

(65) Prior Publication Data

US 2010/0245593 A1    Sep. 30, 2010

(30) Foreign Application Priority Data

Mar. 27, 2009 (KR) .................. 10-2009-0026454

(51) Int. Cl.
 *H04N 7/18* (2006.01)
(52) U.S. Cl. .......................................... 348/135; 348/47
(58) Field of Classification Search .............. 348/43–50, 348/129–130, 135–137
See application file for complete search history.

(56) References Cited

U.S. PATENT DOCUMENTS

| | | | |
|---|---|---|---|
| 5,889,550 A | 3/1999 | Reynolds | |
| 7,127,081 B1* | 10/2006 | Erdem | 382/103 |
| 7,239,718 B2 | 7/2007 | Park et al. | |
| 7,263,207 B2* | 8/2007 | Lee et al. | 382/103 |
| 7,468,742 B2* | 12/2008 | Ahn et al. | 348/207.99 |
| 8,009,192 B2* | 8/2011 | Raskar et al. | 348/135 |
| 2002/0009222 A1* | 1/2002 | McGibbon et al. | 382/154 |
| 2003/0035051 A1 | 2/2003 | Cho et al. | |
| 2003/0185434 A1* | 10/2003 | Lee et al. | 382/154 |
| 2004/0104935 A1* | 6/2004 | Williamson et al. | 345/757 |
| 2005/0088515 A1* | 4/2005 | Geng | 348/47 |
| 2005/0151850 A1* | 7/2005 | Ahn et al. | 348/207.99 |
| 2008/0130985 A1 | 6/2008 | Park et al. | |

FOREIGN PATENT DOCUMENTS

| | | |
|---|---|---|
| KR | 10-2003-0013092 | 2/2003 |
| KR | 10-2004-0055310 | 6/2004 |
| KR | 10-0480780 | 4/2005 |
| KR | 10-2008-0050283 | 6/2008 |

OTHER PUBLICATIONS

"A Flexible New Technique for Camera Calibration," Zhengyou Zhang et al., IEEE Transactions on Pattern Analysis and Machine Intelligence, vol. 22, No. 11, pp. 1330-1334, Nov. 2000.

\* cited by examiner

*Primary Examiner* — Patrice Winder
(74) *Attorney, Agent, or Firm* — Staas & Halsey LLP

(57) ABSTRACT

An apparatus for calibrating images between cameras, includes: a detector for detecting dynamic markers from images taken by a motion capture camera and a video camera; a 3D position recovery unit for recovering 3D position data of the dynamic markers obtained by the motion capture camera; a 2D position tracking unit for tracking 2D position data of the dynamic markers obtained by the video camera; a matching unit for matching the 3D position data and the 2D position data of the dynamic markers; and a calibrating unit for converting the 3D position of the dynamic markers on a spatial coordinate system into image coordinates on an image coordinate system of the video camera to calculate intrinsic parameters and extrinsic parameters of the video camera to minimize a difference between coordinates of the 2D position data and the image coordinates.

20 Claims, 4 Drawing Sheets

APPARATUS AND METHOD FOR CALIBRATING IMAGES BETWEEN CAMERAS

CROSS-REFERENCE(S) TO RELATED APPLICATION(S)

The present invention claims priority of Korean Patent Application No. 10-2009-0026454, filed on Mar. 27, 2009, which is incorporated herein by reference.

FIELD OF THE INVENTION

The present invention relates to an apparatus and method for calibrating a motion capture camera and a high-resolution video camera in an optical motion capture system, and, more specifically, to an apparatus and method for calibrating images between cameras using a dynamic marker without using any separate camera calibrating apparatus or without attaching a calibrating marker to cameras.

BACKGROUND OF THE INVENTION

In the field of 3D contents production, calibration techniques between a motion capture camera and a high-resolution video camera are absolutely essential techniques for producing high-resolution 3D contents for use in more vivid and realistic HD broadcasts and movies, by precisely composing computer graphic animation based on 3D motion capture data of a target object with moving video images that are taken simultaneously on the spot.

In the existing optical motion capture system, techniques for calibrating the motion capture camera and the video camera are classified into a calibration mechanism method which uses a separate camera calibration mechanism pre-manufactured for camera calibration, and a marker attachment method which allows the motion capture camera with a calibrating marker attached to the video camera or the background to recover 3D positions of the calibrating marker attached to the camera, thereby calibrating the cameras.

However, this calibration mechanism method or marker attachment method is restricted by the need of pre-manufacturing process or complicated installation procedure of the separate calibration mechanism or the calibrating marker for calibration of video camera. In addition, the calibration mechanism method or marker attachment method has difficulty since they must use different calibration mechanisms or change the marker attachment scheme depending on locations or conditions for photographing.

For example, the calibration mechanism method must use a large-sized camera calibration mechanism to get better observation even from a far distance for precise and stable camera calibration when a target object needs to be taken by the video camera in a wide motion capture area, and otherwise a small-sized calibration mechanism so as to let the calibration mechanism be seen in the near distance. Also, the marker attachment method has a complicated pre-manufacturing process of the calibrating marker, e.g., it must change the marker attachment scheme to have a larger marker-attached area if the motion capture camera and the video camera become more distant from each other, on the contrary, if those cameras become closer to each other, to have a smaller marker-attached area.

Meanwhile, calibration techniques for the motion capture camera and the video camera described above are not easy to apply when intrinsic parameters of the video camera are not pre-calibrated constants. For instance, the marker attachment method, by its own nature, can calibrate extrinsic camera parameters related to the spatial motion and rotation of the video camera, but it cannot calibrate intrinsic parameters of the camera related to high-resolution camera lens. Moreover, the calibration mechanism method also requires a separate calibration procedure to calibrate the intrinsic parameters.

Because of these problems, the conventional calibration techniques assume that the intrinsic camera parameters are all pre-calibrated constants. However, when it comes to the use of a high-resolution video camera, even a small change in intrinsic camera parameters does not guarantee precise calibration of cameras and therefore intrinsic camera parameters as well as extrinsic camera parameters must be certainly calibrated as variables.

SUMMARY OF THE INVENTION

In view of the above, the present invention provides an apparatus and method for calibrating images between cameras, which enables more vivid and realistic high-resolution 3D contents production, without using a separate camera calibration mechanism or having a separate marker attached to the camera in an optical motion capture system.

In accordance with a first aspect of the present invention, there is provided an apparatus for calibrating images between cameras, including:

a detector for detecting dynamic markers from images taken by a motion capture camera and a video camera;

a 3D position recovery unit for recovering 3D position data of the dynamic markers obtained by the motion capture camera;

a 2D position tracking unit for tracking 2D position data of the dynamic markers obtained by the video camera;

a matching unit for matching the 3D position data and the 2D position data of the dynamic markers; and a calibrating unit for converting the 3D position of the dynamic markers on a spatial coordinate system into image coordinates on an image coordinate system of the video camera to calculate intrinsic parameters and extrinsic parameters of the video camera to minimize a difference between coordinates of the 2D position data and the image coordinates.

In accordance with a second aspect of the present invention, there is provided a method for calibrating images between cameras, including:

detecting dynamic markers from images taken by a motion capture camera and a video camera;

recovering 3D position data of the dynamic markers obtained by the motion capture camera;

tracking 2D position data of the dynamic markers obtained by the video camera;

matching the 3D position data and the 2D position data of the dynamic markers; and converting the 3D position of the dynamic markers on a spatial coordinate system into image coordinates on a image coordinate system of the video camera.

calculating intrinsic parameters and extrinsic parameters of the video camera to minimize a difference between coordinates of the 2D position data and the image coordinates.

BRIEF DESCRIPTION OF THE DRAWINGS

The above features of the present invention will become apparent from the following description of embodiments, given in conjunction with the accompanying drawings, in which.

DETAILED DESCRIPTION OF THE PREFERRED EMBODIMENT

Hereinafter, the operational principle of the present invention will be described in detail with reference to the accompanying drawings. In the following description, well-known functions or constitutions will not be described in detail if they would obscure the invention in unnecessary detail. Further, the terminologies to be described below are defined in consideration of functions in the present invention and may vary depending on a user's or operator's intention or practice. Therefore, the definitions should be understood based on all the contents of the specification.

Figure 1:
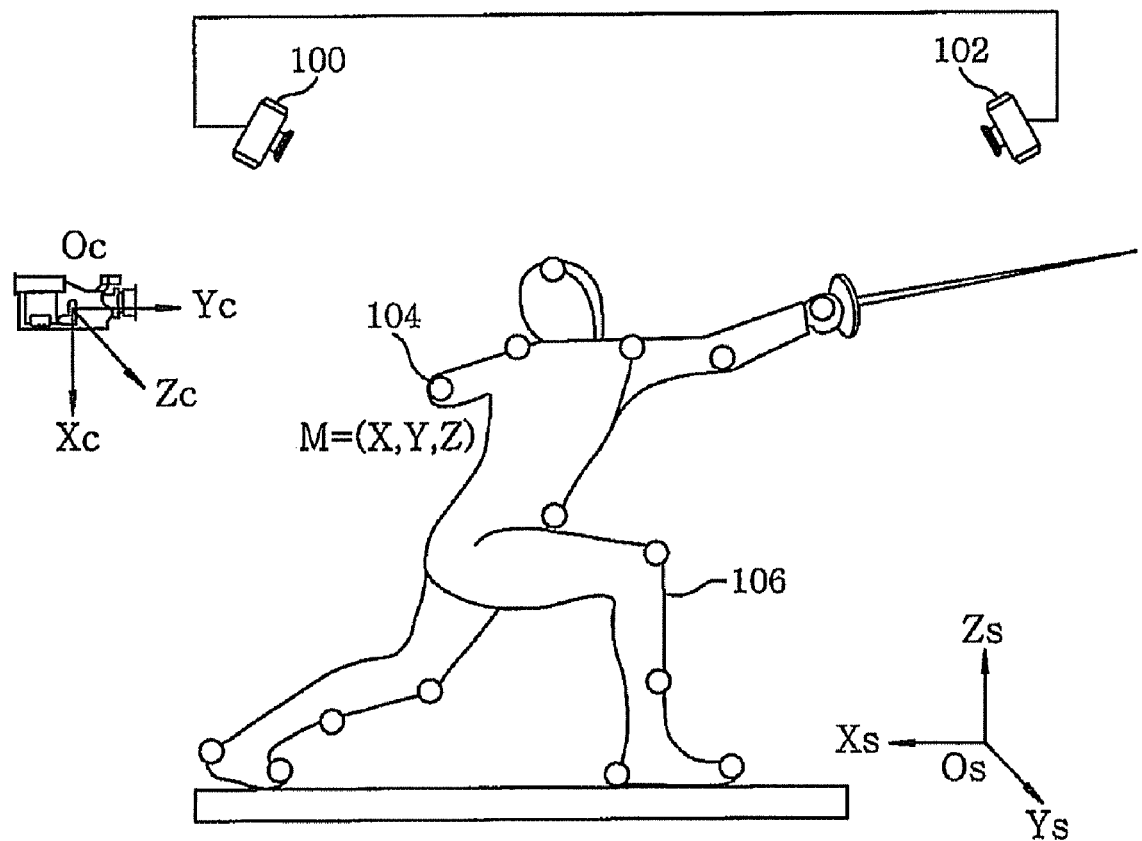
FIG. 1 illustrates the concept of calibration operation between a motion capture camera and a high-resolution video camera by using a dynamic marker in accordance with an embodiment of the present invention.

FIG. 1 illustrates the concept of image calibration using a dynamic marker attached to a target object taken by a motion capture camera and a high-resolution video camera in an optical motion capture system in accordance with an embodiment of the present invention As shown in FIG. 1, in an optical motion capture system, a motion capture camera 102 and a high-resolution video camera 100 are connected to each other. The motion capture camera 102 is used for recovering 3D motion of a target object 106. The high-resolution video camera 100 is used for simultaneously photographing the motion of the target object 106 in high resolution on the spot. A plurality of dynamic markers 104 are attached to the target object 106, instead of using a separate camera calibration mechanism or having a calibrating marker attached to the camera or the background.

In operation, both the motion capture camera 102 and the high-resolution video camera 100 start photographing the target object 106 with the dynamic markers 104 attached thereto to extract 3D position data and 2D position data from the dynamic markers 104 that are attached to the target object 106, thereby performing calibration of the motion capture camera 102 and the high-resolution video camera 100.

The calibration of the motion capture camera 102 and the high-resolution video camera 100 is performed by calculating extrinsic parameters and intrinsic parameters of the high-resolution video camera 100 using geometric relations between 3D position data and 2D position data. Here, the extrinsic parameters of the high-resolution video camera 100 represent a relation between a 3D position coordinate of the dynamic marker 104 on a spatial coordinate system and a coordinate of the dynamic marker 104 on a camera coordinate system. And the intrinsic parameters of the high-resolution video camera 100 represent a relation between the coordinate of the dynamic marker 104 on the camera coordinate system and an image coordinate of the dynamic marker 104 on an image coordinate system.

Figure 2:
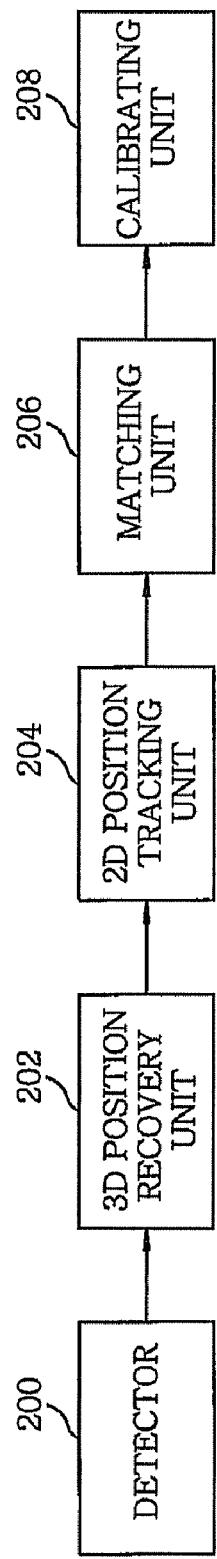
FIG. 2 shows a block diagram of an apparatus for image calibration between the motion capture camera and the high-resolution video camera in accordance with an embodiment of the present invention.

FIG. 2 shows a block diagram of an apparatus for calibrating images between the motion capture camera 102 and the high-resolution video camera 100 in accordance with the embodiment of the present invention. The image calibration apparatus includes a detector 200, a 3D position recovery unit 202, a 2D position tracking unit 204, a matching unit 206 and a calibrating unit 208.

Hereinafter, the operation of each component in the novel apparatus for calibrating images between cameras will be explained in detail with reference to FIG. 2.

As shown in FIG. 2, the detector 200 detects the dynamic markers 104 from images taken by the motion capture camera 102 and the high-resolution video camera 100. Specifically, the detector 200 designates an area surrounding the dynamic marker 104 in images carrying the dynamic marker 104 out of the images taken by the high-resolution video camera 100 as a template for tracking the dynamic marker 104, and detects the dynamic marker 104 from the template.

The 3D position recovery unit 202 recovers 3D position data of the dynamic marker 104 from 3D motion capture data of the dynamic marker 104 taken by the motion capture camera 102 and saves it as 3D camera calibration data.

The 2D position tracking unit 204 tracks 2D position data of the dynamic marker 104 from the images of the dynamic marker 104 taken by the high-resolution video camera 100 and saves it as 2D camera calibration data.

The matching unit 206 matches the 3D position data and the 2D position data of the dynamic marker 104 in one-to-one correspondence.

The calibrating unit 208 calculates the intrinsic parameters and the extrinsic parameters of the high-resolution video camera 100 to minimize a difference between the matched 2D position coordinate of the dynamic marker 104 and an image coordinate converted from the matched 3D position coordinate of the dynamic marker 104.

More specifically, the calibrating unit 208 sets intrinsic parameters of the video camera 100 as constants and converts the 3D position coordinate of the dynamic marker 104 on the spatial coordinate system into a coordinate on the camera coordinate system. And then, the calibrating unit 208 sets the intrinsic parameters of the video camera 100 as variables and converts the coordinate on the camera coordinate system into an image coordinate on the image coordinate system. Further, the calibrating unit 208 calculates and calibrates both the intrinsic parameters and the extrinsic parameters of the high-resolution video camera 100 to minimize the difference between the tracked 2D position coordinate from the 2D position tracking unit 204 and the image coordinate.

Figure 3:
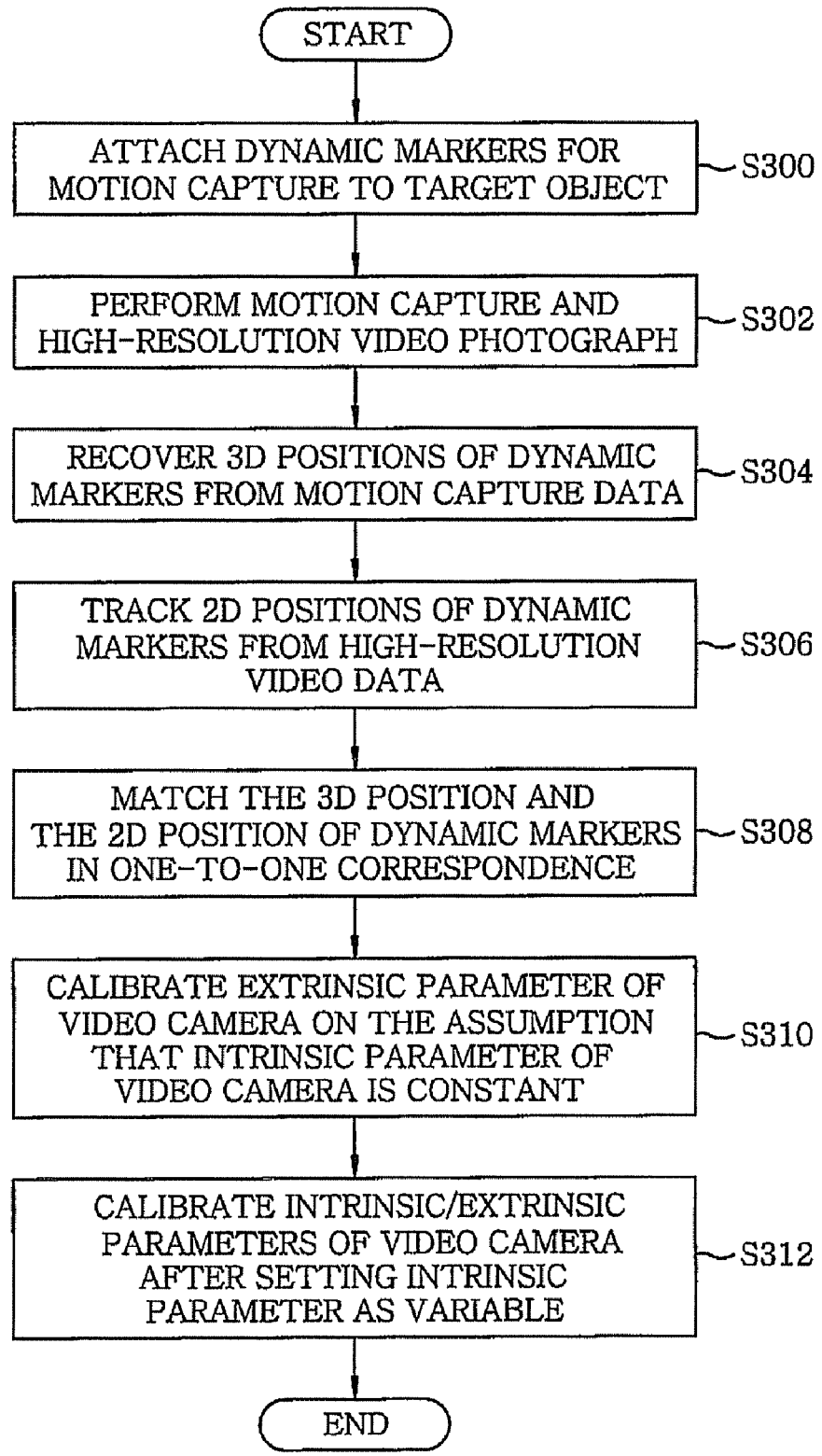
FIG. 3 illustrates a flow chart for explaining a method for image calibration between the motion capture camera and the high-resolution video camera in accordance with the embodiment of the present invention.

FIG. 3 shows a flow chart for explaining a method for carrying out the calibration between the motion capture camera 102 and the high-resolution video camera 100 in accordance with the embodiment of the present invention.

First, in step S300, the dynamic markers 104 for motion capture are attached to the target object 106. At this time, the dynamic markers 104 attached to the target object 106 are dynamic markers whose 3D position values are variable depending on the motion of the target object 106, unlike the fixed, i.e., stationary markers attached to the camera calibration mechanism, and there is no limit to the locations or number of the dynamic markers 104 to be attached.

Next, in step S302, a motion capture and high-resolution video photograph are performed on the target object 106, specifically, on the dynamic marker 104 being attached to the target object 106 using the motion capture camera 102 and the high-resolution video camera 100.

In practice, at least two motion capture cameras 102 are required for use in motion capture, and the more the number of motion capture cameras 102 is, the more precise and stable motion capture can be achieved. In addition, there is no limit to the number of video cameras 100 for use in high-resolution video photograph. In this case, if two or more video cameras 100 are used, each of the video cameras 100 can be calibrated using the same video camera calibration method proposed in the present invention.

For this calibration, a synchronization between the motion capture camera 102 performing motion capture at high speed (60 Hz or more) and the video camera 100 recording video at low speed (30 Hz or less) is required. First, internal clocks of the motion capture camera 102 and internal clocks of the video camera 100 are synchronized through gen-lock, and the motion capture camera 102 and the video camera 100 are then set up to start and end recording at the same time using a time-code.

Next, in step S304, the 3D position recovery unit 202 recovers 3D position data of all dynamic markers 104 from 3D motion capture data recorded through the motion capture camera 102 and saves it as 3D camera calibration data. Here, the 3D camera calibration data further include a label for distinguishing each of the dynamic markers 104 and a frame number of corresponding 3D motion capture data to show the time when the recovered dynamic markers 104 are recorded by the motion capture camera 102.

Next, in step S306, the 2D position tracking unit 204 tracks 2D position in images of dynamic markers 104 from the recorded high-resolution video data and saves the 2D position values as 2D camera calibration data. Here, the 2D camera calibration data also include a label, and a frame number in the video data.

When tracking the dynamic marker 104 from images, an area surrounding the dynamic marker 104 in actual video images is designated as a template for tracking each dynamic marker 104, so as to more precisely and stably track the dynamic marker 104 of a simple form, color and a small size from the images. To make such template be strong against changes in lighting or noise or being covered, a number of images, not one single image, are used for making the template. Therefore, the dynamic marker 104 can be tracked in the video images more stably and precisely. In addition, a search area for template matching should be variable, not stationary, to allow tracking of the dynamic marker 104 through template matching to adaptively respond to the motion speed of the target object 106.

Next, in step S308, the matching unit 206 matches the 3D position data of every dynamic marker 104 recovered through the motion capture camera 102 with the 2D position data tracked by the high-resolution video camera 100 in one-to-one correspondence, based on the labels and frame numbers included in the 3D camera calibration data and the 2D camera calibration data. Here, since the operating speed of the motion capture camera 102 is an integral multiple of the recording speed of the video camera 100, it is possible to find matching data through a simple sampling operation.

Thereafter, the calibrating unit 208 calculates extrinsic and intrinsic parameters for calibration of the motion capture camera 102 and the video camera 100. Here, camera calibration is for overlaying the motion capture data, i.e., the 3D position of the dynamic marker 104, on a high-resolution video image, for visualization.

Figure 4:
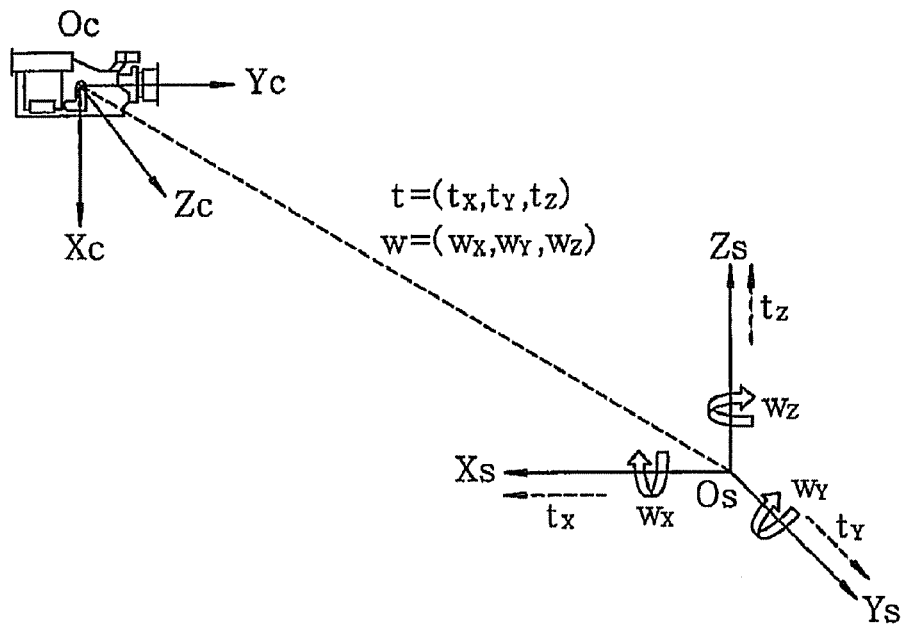
FIG. 4 describes the concept of converting spatial coordinates of the dynamic marker into camera coordinates in accordance with the embodiment of the present invention.

To this end, first, as shown in FIG. 4, extrinsic parameters including pose information, which is expressed as the motion $t=(t_X,t_Y,t_Z)$ and rotation $w=(w_X,w_Y,w_Z)$ of the video camera 100 on the spatial coordinate system (Os) that is the coordinate reference of 3D motion capture data, is calculated. Through the calculated extrinsic parameters, 3D position coordinates of the dynamic marker 104 on the spatial coordinate system 402 are converted into coordinates on the camera coordinate system (Oc) of the video camera 100.

Figure 5:
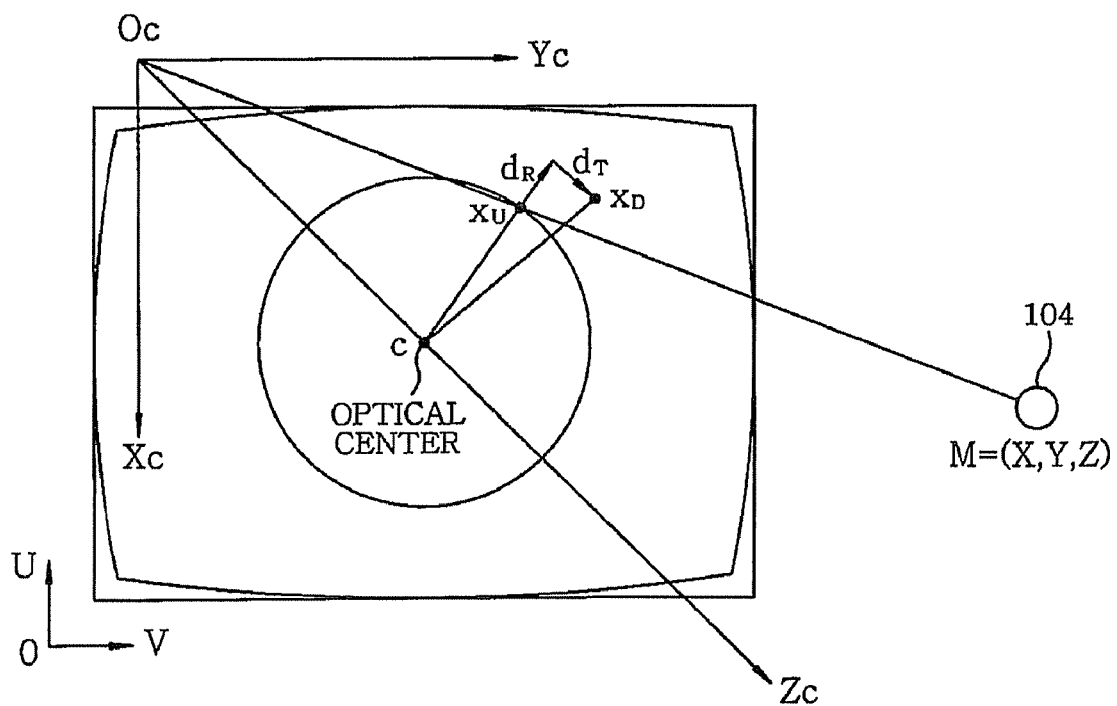
FIG. 5 presents the concept of calibrating intrinsic parameters of a high-resolution video camera, in accordance with the embodiment of the present invention.

Also, intrinsic parameters of the video camera 100 are calculated to convert the coordinates on the camera coordinate system 400, into image coordinates on the image coordinate system (O) of the video camera 100. Here, the intrinsic parameters include, as shown in FIG. 5, a focal length of a lens of the video camera 100, an optical center c of the lens, radial distortion $d_R$ of the lens, and tangential distortion $d_T$ of the lens.

In practice, displacement between the ideal image coordinate $x_U$ and the actual image coordinate $x_D$ due to the camera lens's distortion has a great impact on the precision of calibration of the high-resolution video camera 100. In other words, if the video camera 100 has a high resolution, even a small change in the intrinsic parameters can have a major impact on the marker's image coordinates, and thus, with the intrinsic parameters set as not constants but variables, the intrinsic parameters as well as the extrinsic parameters need to be calibrated at the same time, so as to get precise and stable results.

As described above, in step S310, for calibrating both of the extrinsic and intrinsic parameters of the video camera 100, the extrinsic parameters are first calibrated, on the assumption that the intrinsic parameters are constants. At this time, the reason of calibrating the extrinsic parameters first is because, unlike the intrinsic parameters of which value is given as constants by the manufacturer, the extrinsic parameters are variables changing all the time. These extrinsic parameters of the video camera 100 are calculated by solving an equation induced from a geometric relationship between the 3D spatial position M of the dynamic marker 104 on the space and the 2D position $x_D$ of the dynamic marker 104 on the actual image, using a linear algebraic method.

Here, unlike the conventional calibration mechanism method or marker attachment method, the present invention directly uses the 3D position of the dynamic marker 104 on the target object 106 for video overlay and the 2D position on the video image to be actually composed for camera calibration, thereby guaranteeing stability and precision of the camera calibration required for composition.

Lastly, in step S312, the extrinsic parameters and the intrinsic parameters are together calibrated after setting the intrinsic parameters of the video camera 100 as variables. At this time, the calculated extrinsic parameters of step S310 and the intrinsic parameters of constant values are set as initial values. And 2D position of the dynamic marker 104 is estimated by projecting the 3D position M of the dynamic marker 104 onto the image from the video camera 100 with the above initial values. The extrinsic parameters and the intrinsic parameters of the video camera 100 are calibrated through a non-linear optimization method so as to minimize an error value of the error function equation induced to make a difference between the estimated 2D position and the actually tracked 2D position $x_D$ by the 2D position tracking unit 204 become minimum.

As explained above, the present invention does not use a separate camera calibration mechanism or do not attach a marker for calibration to the camera or the background in an optical motion capture system, but directly uses 3D data of the dynamic marker recovered from the motion capture camera and 2D data of the dynamic marker tracked on the high-resolution video images recorded on the spot, thereby enabling the composition of 3D motion capture data with high-resolution video images. Accordingly, the present invention has advantages of precise and stable calibration of the video camera required for producing high-resolution 3D contents for use in HD broadcasts and movies.

Moreover, since the present invention directly uses data of the dynamic markers attached to a target object that is subject to motion capture or being photographed for calibration between the motion capture camera and the high-resolution video camera, it can resolve restrictions by the existing methods such as the calibration mechanism method and the marker attachment method. Furthermore, the present invention can calibrate not only extrinsic camera parameters related to a motion and rotation of the video camera in 3D space but also intrinsic camera parameters associated with the video camera's lens, and thus, stability and precision of image composition can be improved even more through the calibration of the high-resolution video camera.

While the invention has been shown and described with respect to the embodiments, it will be understood by those skilled in the art that various changes and modification may be made without departing from the scope of the invention as defined in the following claims.

What is claimed is:

1. An apparatus for calibrating images between cameras, comprising:
    a detector for detecting dynamic markers from images taken by a motion capture camera and a video camera;
    a 3D position recovery unit for recovering 3D position data of the dynamic markers obtained by the motion capture camera;
    a 2D position tracking unit for tracking 2D position data of the dynamic markers obtained by the video camera;
    a matching unit for matching the 3D position data and the 2D position data of the dynamic markers; and
    a calibrating unit for converting the 3D position of the dynamic markers on a spatial coordinate system into image coordinates on an image coordinate system of the video camera to calculate intrinsic parameters and extrinsic parameters of the video camera to minimize a difference between coordinates of the 2D position data and the image coordinates.

2. The apparatus of claim 1, wherein the detector designates an area surrounding the dynamic marker in images where the dynamic marker is included as a template for tracking the dynamic marker, and detects the dynamic marker from the designated template.

3. The apparatus of claim 2, wherein the detector detects position of a template, which is set up in different positions in each image frame, through template matching with a previous image frame.

4. The apparatus of claim 3, wherein the detector sets the size of an area for searching the template within the images where the dynamic marker is included to be variable depending on a motion speed of the dynamic marker.

5. The apparatus of claim 1, wherein the recovered 3D position data are saved as 3D camera calibration data and the 3D camera calibration data includes label information for distinguishing the dynamic markers.

6. The apparatus of claim 5, wherein the 3D camera calibration data further includes a frame number that indicates the time when the dynamic marker is recorded by the motion capture camera.

7. The apparatus of claim 1, wherein the tracked 2D position data are saved as 2D camera calibration data and the 2D camera calibration data includes label information for distinguishing the dynamic markers.

8. The apparatus of claim 7, wherein the 2D camera calibration data further includes a frame number that indicates the time when the dynamic marker is recorded by the video camera.

9. The apparatus of claim 1, wherein the calibrating unit sets the intrinsic parameters of the video camera as constants, performs primary conversion of the 3D position on the spatial coordinate system of the dynamic marker into coordinates on the camera coordinate system of the video camera, sets the intrinsic parameters as variables for calibration, and then performs secondary conversion of the coordinates on the camera coordinate system into the image coordinates on the image coordinate system of the video camera.

10. The apparatus of claim 9, wherein the intrinsic parameters of the video camera include a focal length of a lens of the video camera, an optical center of the lens, radial distortion of the lens, and tangential distortion of the lens.

11. A method for calibrating images between cameras, comprising:
    detecting dynamic markers from images taken by a motion capture camera and a video camera;
    recovering 3D position data of the dynamic markers obtained by the motion capture camera;
    tracking 2D position data of the dynamic markers obtained by the video camera;
    matching the 3D position data and the 2D position data of the dynamic markers; and
    converting the 3D position of the dynamic markers on a spatial coordinate system into image coordinates on a image coordinate system of the video camera;
    calculating intrinsic parameters and extrinsic parameters of the video camera to minimize a difference between coordinates of the 2D position data and the image coordinates.

12. The method of claim 11, wherein said detecting dynamic markers includes:
    setting an area in each image frame as a template for tracking a dynamic marker; and
    detecting the dynamic marker from the designated template.

13. The method of claim 12, wherein the template is set up to a size of the area surrounding the dynamic marker, and performs template matching a template of a current image frame with that of a previous image frame for tracking the template position in each image frame.

14. The method of claim 13, wherein a size of a search area for searching the template is set up to be variable depending on a motion speed of the dynamic marker between image frames.

15. The method of claim 11, wherein the recovered 3D position data are saved as 3D camera calibration data and the 3D camera calibration data includes label information for distinguishing the dynamic markers.

16. The method of claim 15, wherein the 3D camera calibration data further includes a frame number that indicates the time when the dynamic marker is recorded by the motion capture camera.

17. The method of claim 11, wherein the tracked 2D position data are saved as 2D camera calibration data and the 2D camera calibration data includes label information for distinguishing the dynamic markers.

18. The method of claim 17, wherein the 2D camera calibration data further includes a frame number that indicates the time when the dynamic marker is recorded by the video camera.

19. The method of claim 11, wherein said converting the 3D position of the dynamic markers includes:
setting the intrinsic parameters of the video camera as constants, and performing primary conversion of the 3D position on the spatial coordinate system of the dynamic marker into coordinates on the camera coordinate system of the video camera; and
setting the intrinsic parameters as variables for calibration, and then performing secondary conversion of the coordinates on the camera coordinate system into image coordinates on the image coordinate system of the video camera.

20. The method of claim 19, wherein the intrinsic parameters of the video camera include a focal length of a lens of the video camera, an optical center of the lens, radial distortion of the lens, and tangential distortion of the lens.

* * * * *